United States Patent [19]

Knauer et al.

[11] Patent Number: 5,083,206

[45] Date of Patent: Jan. 21, 1992

[54] HIGH DEFINITION TELEVISION ARRANGEMENT INCLUDING NOISE IMMUNITY MEANS

[75] Inventors: Scott C. Knauer, Mountainside; Arun N. Netravali, Westfield; Eric D. Petajan; Peter H. Westerink, both of Millburn, all of N.J.

[73] Assignee: AT&T Bell Laboratories, Murray Hill, N.J.

[21] Appl. No.: 495,507

[22] Filed: Mar. 19, 1990

[51] Int. Cl.⁵ .......................... H04N 7/12; H04N 7/00
[52] U.S. Cl. ..................... 358/141; 358/133; 358/136; 358/177
[58] Field of Search ............... 358/141, 142, 143, 177, 358/133, 138, 105, 12, 13, 135, 136, 167

[56] References Cited

U.S. PATENT DOCUMENTS

| | | | |
|---|---|---|---|
| 4,268,854 | 5/1981 | Ozawa | 358/27 |
| 4,694,336 | 9/1987 | Keesen et al. | 358/133 |
| 4,797,739 | 1/1989 | Tanaka | 358/133 |
| 4,930,013 | 5/1990 | Leaming | 358/133 |
| 4,974,078 | 11/1990 | Tsai | 358/133 |
| 5,040,062 | 8/1991 | Knauer et al. | 358/141 |

*Primary Examiner*—James J. Groody
*Assistant Examiner*—Safet Metjahic
*Attorney, Agent, or Firm*—Henry T. Brendzel

[57] ABSTRACT

A high definition television system that is characterized by low transmission bandwidth is achieved by removing much of the redundancies in the signal, efficiently encoding the remaining signals, and transmitting the encoded signal in a manner that is most compatible with the applicable standards. To enhance noise immunity a number of techniques are employed. One is to encode adjacent low-amplitude signals into larger signal samples, another one is the introduction of a controllable gain feature, a third one is the introduction of both fixed and variable leak, and still another one is the incorporation of signal scrambling.

30 Claims, 6 Drawing Sheets

SAMPLE I

HIGH DEFINITION TELEVISION ARRANGEMENT INCLUDING NOISE IMMUNITY MEANS

BACKGROUND OF THE INVENTION

This invention relates to high definition television. More particularly, this invention relates to a method and apparatus for encoding and decoding video signals for HDTV.

This application is related to a number of applications filed on even date herewith, titled: "A High Definition Television Arrangement Employing Motion Compensated Prediction Error Signals", "A High Definition Television Arrangement With Signal Selections Adapted to the Available Transmission Capacity", "PAM Signal Modulation With Mappings to Improve Utilization of Available Transmission Capacity", and "A Television Signal Arrangement Where Selected Signals are Encoded Digitally".

Video signals typically originate from video cameras. The bandwidth of video signals is quite substantial and, consequently, practitioners in the art have tried to reduce the bandwidth of these signals without unduly degrading the images. Typically, to reduce bandwidth, the video signals are encoded, and redundancies in the encoded signals are extracted and deleted. Different techniques are used in the art. Some are better suited for still images, while others are better suited for moving images. One of the techniques for reducing the bandwidth of moving images is generally referred to as motion compensated predictive coding.

In conventional motion compensated predictive coding, each video frame is first partitioned into square blocks of picture elements (pels); such as blocks of 8 pels by 8 pels. Each block is coded, in turn, and the developed encoded sequence is transmitted over a communications channel to a decoder. The communications channel may be, or may include, a storage element. Following the partitioning step in the encoding process, a determination is made as to whether or not the pels of the block have changed significantly compared with the previous frame. If not, an indicator signal is sent which signifies to the decoder that it needs to merely repeat the pels of that block from the previous frame to obtain the pels for the current block. This step is known as "Conditional Replenishment". If the pels have changed since the previous frame, an attempt is made to determine the best estimate of motion that is occurring in the block. This is frequently done by a "Block Matching Motion Estimation" technique wherein the pels of the current block are successively compared with various small shifts of the corresponding block in the previous frame. The shift that gives the best match is deemed to be the "best estimate" of the displacement in the block's image between frames, and the amount of this shift, called the "Motion Vector", is selected and sent to the decoder.

The "best estimate" is, of course, the estimate that yields the smallest difference signal between the image in the current block and the image in the shifted block of the previous frame. This difference signal forms the error signal. When the error signal is sufficiently small, an indicator signal is sent to the decoder, which merely causes the pels of the shifted block from the previous frame to be repeated for the pels for the current shifted block. Such blocks are said to have been successfully "Motion Compensated". However, if there is a significant difference between the two blocks, the difference is encoded and sent to the decoder so that the pels of the current block may be more accurately recovered. Coding of this difference is typically performed by means of the "Discrete Cosine Transform" (DCT). It is a measure of energy.

The amount of coded information that is generated by the above procedure is variable. It can be appreciated, for example, that image changes that do not correspond to a uniform translation, or motion, of the image may require substantial encoding to describe the deviation of a block from its best translated replica. On the other hand, when the image does not change between successive frames, then there is a minimal amount of information that needs to be encoded. To accommodate these potentially wide variations in the amount of code that needs to be transmitted, typical encoders include a memory at the output, to serve as a buffer.

The buffer is not a panacea, however. For a given transmission rate, when an excessive volume of data is generated, there is always a danger that the FIFO would overflow. When it does, coding must stop until the transmission channel can empty the FIFO sufficiently to permit new data to be inserted.

All of the above teachings in the art deal with the coding and decoding aspects of reducing the bandwidth of the TV signal, but none deal explicitly with the formatting of the signal in preparation for transmission. When it comes to high definition television, both the bandwidth and the formatting problems must be solved and the difficulties are even greater than in connection with conventional TV signals because the desired signal compression is even greater, and because the requirement for a more authentic representation of the original image are more stringent.

SUMMARY OF THE INVENTION

A high definition television system that is characterized by low transmission bandwidth is achieved by removing much of the redundancies in the signal, efficiently encoding the remaining signals, and transmitting the encoded signal in a manner that is most compatible with the applicable standards. To enhance noise immunity a number of techniques are employed. The first technique is to encode adjacent low amplitude PAM signals into larger PAM samples. This increases the signal strength as it frees up space to send additional signals. Another technique is to introduce controllable gain feature, with and without mapping of large amplitude PAM supplies into smaller ones. The controllable gain factor is selected for chosen signal intervals to increase the signal power and thereby reduce the effect of noise introduced in the course of signal transmission. A third technique is the introduction of both fixed and variable leak. In accordance with this technique, a portion of the original signal is incorporated in the transmitted prediction signals to insure that the receiver's buffer is flushed out regularly. To ameliorate the effects of first noise, the fourth technique is signal scrambling of the PAM pulses, on an individual basis.

DETAILED DESCRIPTION

Figure 1:
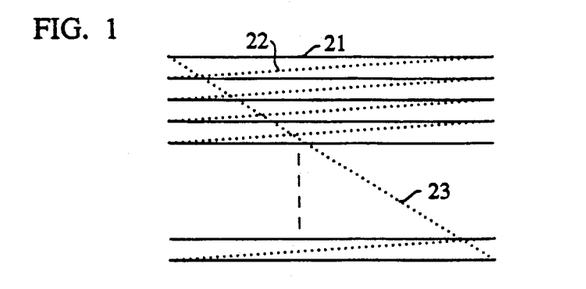
FIG. 1 depicts the conventional television scan arrangement.

FIG. 1 depicts a conventional TV raster. The picture is developed by scanning the image one line at a time. Each scan line (21) is followed by a horizontal retrace 22 and the last line of the frame is followed by a vertical retrace 23 which includes a vertical sync pulse embedded in the retrace interval. Conventional TV includes an "interlace" concept, but for the purposes of this description it is of no significance. It may be noted, however, that the aspect ratio of HDTV, which is expected to be 16 to 9, is different from that of conventional TV. This fact also has very little significance to this description.

Figure 2:
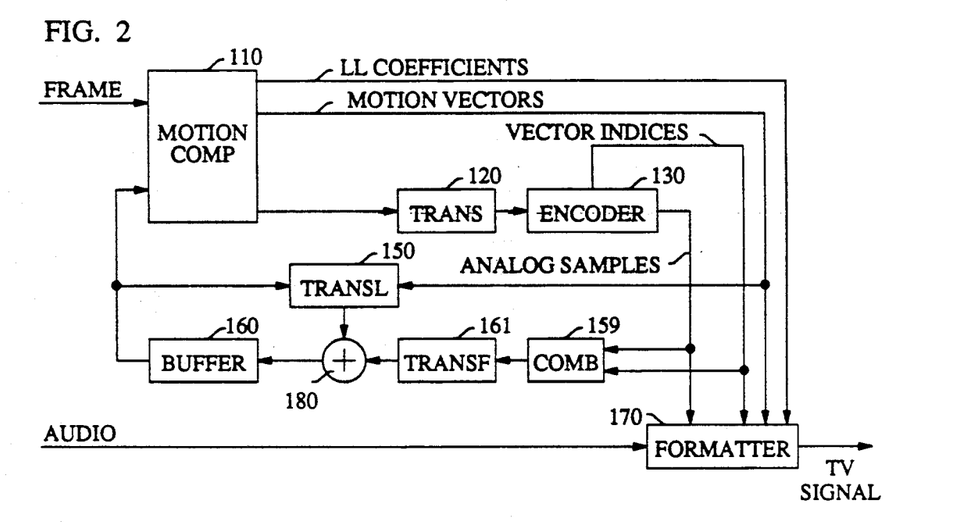
FIG. 2 presents a block diagram of the signal encoder portion of a video transmitter.

FIG. 2 depicts a general block diagram of a video transmitter. Block 110 is responsive to an incoming frame and to a frame within buffer 160. It develops low frequency coefficients (LL coefficients) which are applied to formatter 170, motion vectors which are applied to formatter 170 and translation circuit 150, and motion-compensated prediction error signals which are applied to transformer block 120. Block 120 performs a transformation on the applied signals (basically a time domain to frequency domain transformation) and applies the results to encoder block 130. Encoder 130 develops a greatly reduced set of signals, in the form of discrete amplitude error signals and vector index signals, which, in combination, represent the signals created in block 120. It forwards the developed signal streams to formatter 170 and combiner 159. The signals developed in encoder 130 are selected and arranged to fill the available transmission capacity with the information that is most important for an authentic recreation of the original image.

In the feedback portion of the transmitter, combiner 159 is responsive to the error signals and the vector index signals of encoder 130. Its function is to recover the frequency coefficients that were selected and encoded in block 130. Its output is applied to transform circuit 161, and its function is to reconstitute, as best it can, the input signals of transformation block 120. The output of block 161 is added in element 180 to a motion compensated estimate of the frame and the sum is placed in buffer 160. The motion compensated estimate is developed in translation circuit 150 which is responsive to buffer 160 and to the motion vectors.

Formatter 170 combines the information supplied by blocks 130 and 110 with audio information associated with the frame, and creates a signal in a format that is suitable for whatever transmission medium is employed by the user. In accordance with one aspect of this invention, the error signals developed by encoder 130 are organized to fit within, and are formatted to be in, the line scans interval of the frame. All of the other signals applied to formatter 170 are encoded into the retrace interval of the frame.

Figure 3:
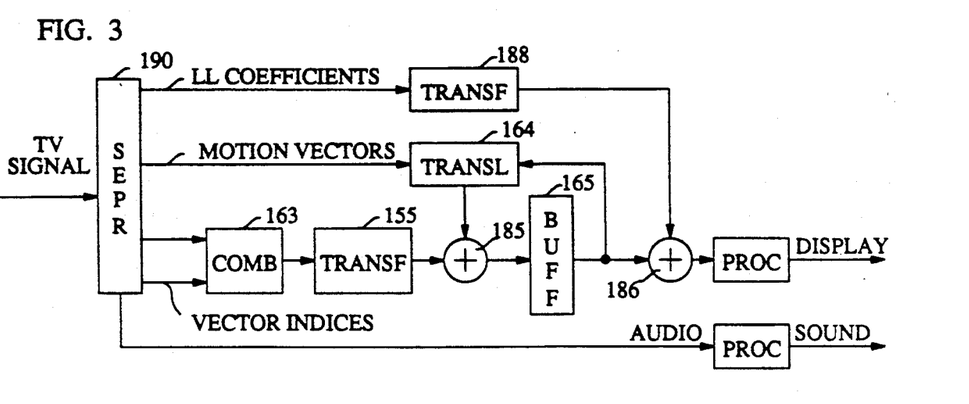
FIG. 3 presents a block diagram of a receiver comporting with the signals developed by the FIG. 2 transmitter.

The receiver that corresponds to the transmitter of FIG. 2 is shown in FIG. 3. It includes a separation block 190 which recovers the audio signals, the LL and motion vectors signals of block 110 and the output signals of encoder 130. The signals corresponding to the output signals of encoder 130 are applied to combiner block 163. Like combiner block 159, block 163 recovers the frequency coefficients selected and encoded in block 130. The output is applied to transform circuit 155 which reconstitutes, as best it can, the input signal of transformation of block 120. Concurrently, the motion vectors developed in block 110 are applied to translator circuit 164 which modifies the output of buffer 165 in accordance with those vectors. The result is applied to adder 185 which sums the output signals of blocks 155 and 164 and applies the results to buffer 165. Buffer 165 contains an $\overline{LL}$ video frame information of the receiver (which is the image, minus the portion represented by the LL coefficients). Simultaneously with the processing in elements 155 and 185, the LL coefficients of block 190 are applied to transform block 188 which develops the LL image of the receiver. The LL image is added to the $\overline{LL}$ image in element 186, to form the final receiver frame. The receiver frame is processed and displayed, and the associated audio is processed and converted to sound.

Figure 4:
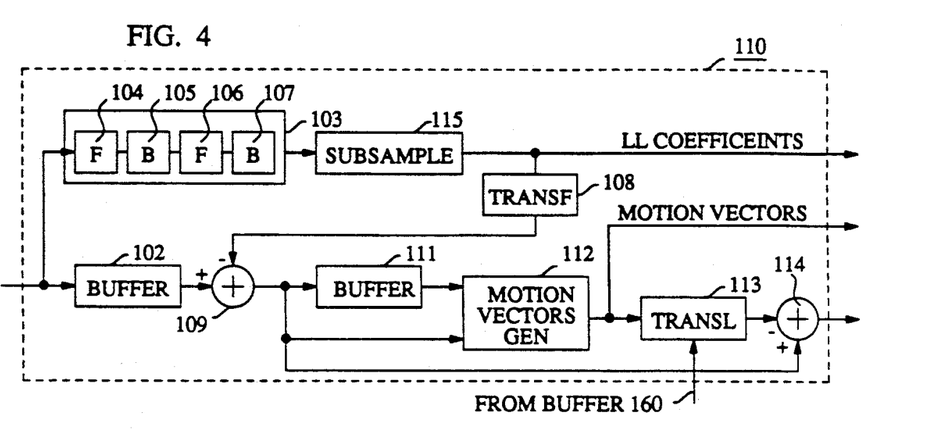
FIG. 4 is a detailed block diagram of the motion compensator circuit in the FIG. 2 transmitter.

The details of motion compensation block 110 are shown in FIG. 4. Therein, the incoming frame is connected to buffer 102 and to two-dimensional low pass filter 103 coupled to sub-sampler 115. Filter 103 contains a conventional low pass filter 104, a buffer 105 for rearranging the data, a conventional low pass filter 106 responsive to buffer 105, and a buffer 107 for a second rearranging of the data. Filter 103 thus develops two-dimensional low frequency coefficients (LL coefficients) which are subsampled in 115 and applied to formatter 170. The subsampled output of filter 103 is also applied to transform block 108 which develops an LL image corresponding to the LL coefficients. While the LL coefficients and the LL image are developed, the applied image frame is delayed in buffer 102. The delayed image and the LL image are applied to subtracter 109, which subtracts the LL image from the applied image to yield an image where the low spatial frequencies are missing (i.e., the $\overline{LL}$ image). The $\overline{LL}$ frame output of subtracter 109 is applied to frame buffer 111, to motion vectors generator block 112 and to adder 114. As the $\overline{LL}$ frame is stored in buffer 111, the previously stored $\overline{LL}$ frame is extracted from buffer 111 and applied to motion vectors generator block 112. Motion vectors generator 112 operates on non-overlapping blocks of the image. These blocks can be of any size, but the size that we employ in connection with the HDTV embodiment described therein is 36 by 32 pixels (36 pixels in a row, 32 rows). For each selected block, a selected neighborhood of the block is searched in the previous frame (found in buffer 111) for a block of pixels that most approximates the block in question. In this manner, a motion vector is obtained that points to an area of the image in buffer 111 that best approximates the block in question.

The search process, to a single pixel accuracy, is perfectly conventional. To improve performance, our motion vectors are computed to $\frac{1}{2}$ pixel accuracy. This is accomplished by first developing a motion vector to 1 pixel accuracy and then interpolating in the neighborhood pointed to by the motion vector between rows and between pixels in the rows of the previous block to determine whether a subpixel motion vector specification is called for.

Figure 5:
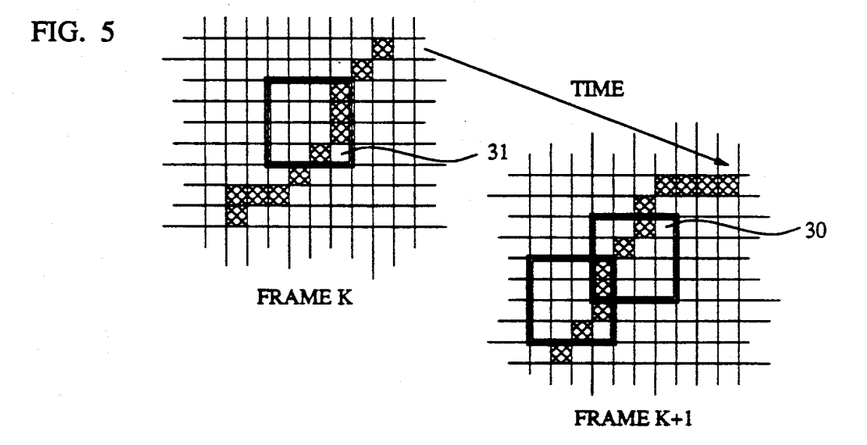
FIG. 5 illustrates the concept of motion compensation.

To illustrate, FIG. 5 depicts a region 31 in frame K and a block of pixels 30 in frame K+1. As can be seen from a review of the two, block 30 of frame K+1 may be described quite accurately by stating that it corresponds to the region in frame K that is shifted with respect to the position of block K by two pixels upwards and three pixels to the right.

The motion vectors of generator block 112 are applied in FIG. 4 to translator 113. The other input of translator 113 is the output signal of buffer 160 of FIG. 1. As mentioned above, the output of buffer 160 represents the previous $\overline{LL}$ frame as it is known to the receiver. The motion vectors are compared in translator 113 with the image of buffer 160 to form a predicted motion-compensated $\overline{LL}$ frame. Typically, this predicted frame does not faithfully represent the $\overline{LL}$ frame. Almost always there are errors in the predicted frame because perfect matching can rarely be attained. To ascertain the position and intensity of those errors, the motion-compensated $\overline{LL}$ frame of translator 113 is applied to subtracter 114, wherein it is compared to the $\overline{LL}$ frame signal itself. The output of subtracter 114 is a frame of motion-compensated prediction error signals. Those signals are applied to transformer block 120.

Figure 6:
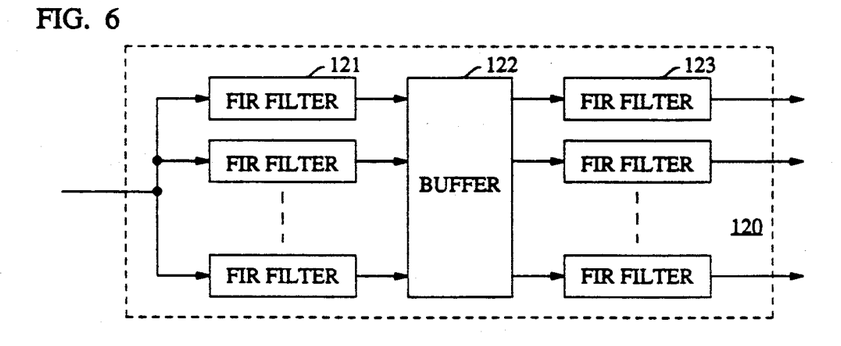
FIG. 6 develops one structure of the two-dimensional transformation circuit in the FIG. 2 arrangement.

Transformer block 120 maps the information to the frequency domain. Although there are many approaches for such a mapping, the approach chosen here involves 16 FIR filters, as depicted in FIG. 6. Specifically, the input of block 120 is applied to 8 "horizontal" filters 121. Each filter spans 64 pixels and develops a coefficient that represents the intensity of signals in a chosen frequency band. The filters are termed "horizontal" because the input pixels to a filter are taken from successive pixels on the same line scan of the frame, and because successive coefficients are obtained by sliding the filter horizontally. The horizontal shift is by 8 pixels. Each developed coefficient is associated with the pixel that is at the center of the neighborhood defined by the 64 pixels, and thus, each line scan of M pixels produces M/8 coefficients in each of the 8 FIR filters (assuming that something is done at the edges of the scan lines—such as creating pixels to satisfy for the filter needs). The frequency bands that are evaluated by the 8 filters are chosen, or controlled, by the coefficients that are incorporated within the FIR filters. The outputs of the "horizontal" filters are appropriately rearranged with the aid of buffer 122 and applied to 8 "vertical" filters 123, which may be identical to the "horizontal" filters and which process the signals in the identical fashion. The overall effect that is created is that of two-dimensional filtering. Description of block oriented two-dimensional filtering can be found, for example, in U.S. Pat. No. 4,829,465 issued May 9, 1989.

Figure 7:
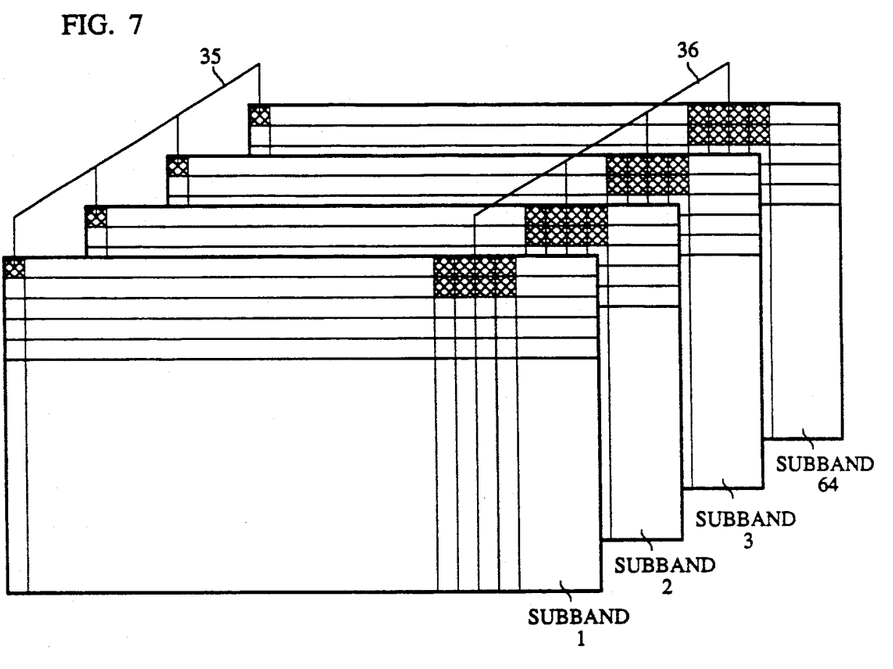
FIG. 7 presents a pictorial view of the subbands developed in the transmitter and the vectors that define the subband signals.

The output of transformer block 120 can be viewed as a collection of 64 subband frames, as depicted in FIG. 7. Each subband frame defines a subband with N/8 rows of coefficients and M/8 coefficients per row, where N and M are the numbers of rows and pixels per row in the image frame. As can also be observed in FIG. 7, corresponding coefficients in the subbands can be grouped to form vectors, such as vector 35. The elements of such vectors all stem from a common set of motion-compensated prediction error signals (of block 110). Alternatively, groups of coefficients in each subband (such as blocks comprising 2 rows of 4 coefficients) can be combined to form elements of a vector. This is illustrated by vector 36. In accordance with this invention, when vectors such as vector 36 are employed, the 64 subband frames may be represented by MN/512 vectors.

It is recognized that there are more efficient and less efficient ways of communicating the information contained in the 64 subband frames. The challenge, of course, is to select a more efficient approach rather than a less efficient one. It is also recognized that some granularity may be introduced, and some information in the frequency domain may be ignored without unduly damaging the image quality. Based on these recognitions, the function of encoder block 130 is to identify the most important image information contained in the 64 subband frames and to pack this information in the available transmission capacity. This may be accomplished in three steps. In the first step of such a three step approach, a selection is made to transmit some information and to simply ignore some information. In the second step, the information to be transmitted is approximated by choosing to transmit from a restricted lexicon of signals. The lexicon restriction results in lower demands on the digital transmission capacity. In the third step, the information is packed within the available transmission capacity.

Having mentioned "transmission capacity", it makes sense at this point to describe what the available transmission capacity is.

Referring to FIG. 1, the line scans, the horizontal retrace and the vertical retrace periods are all directly related to the operation of the TV screen. They need not relate necessarily to the transmission of information to the TV receiver, as long as some means are provided to synchronize the screen to the received frame information. Hence, subject to the synchronization requirement, the time interval corresponding to the sum of those periods can be devoted entirely to the transmission of frame information.

In a terrestrial transmission environment, each TV channel is allocated a specific bandwidth. Typically, at the transmitter's end the TV signal is band limited and modulated (AM) onto a carrier. To minimize interference between TV channels, a "taboo" guard band separates adjacent TV channels, where no signals should be present. The "taboo" bands are needed because the band limiting of the baseband signals is not absolute and because there are always nonlinearities in the transmitter. Nonlinearities cause harmonic spillover. Even low levels of interference are often objectionable because they create "ghosts" in the interfered channel. The human eye is quite adept at detecting these patterns.

The need for reducing interference is greatest during the line scan. During the retrace periods, in contradistinction, much greater interference can be tolerated. At such intervals whatever interference is introduced needs to be limited only to the point of insuring that the interfering signal does not cause a loss of synchronization. In accordance with one aspect of this invention, interference is maintained at an acceptably low level by limiting the bandwidth of the information sent during the line scan intervals to the assigned channel's frequency band. During retrace, the bandwidth of the transmitted information may be allowed to expand into the "taboo" channel. More specifically, in accordance with the principles of this invention, during the line scan intervals we send motion-compensated prediction error coefficients that are selected to fit within the allocated signal bandwidth. All other information is sent during the retrace intervals.

Figure 8:
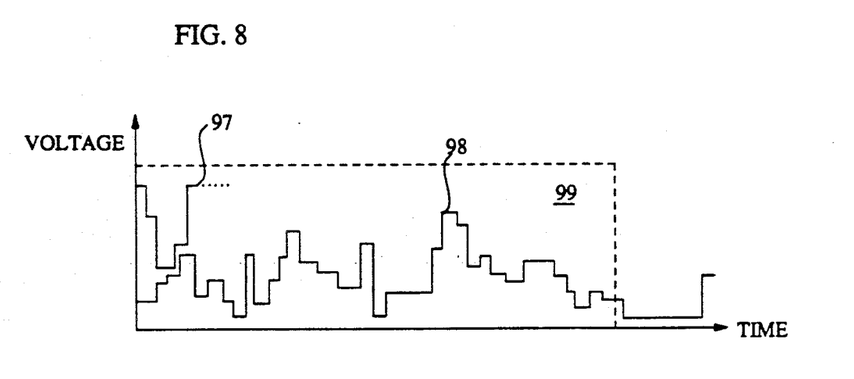
FIG. 8 depicts a PAM signal and its utilization of the available transmission capacity.

Since the energy in the error signals represents the deviation of the predicted image from the true image, it is desirable to transmit as much of the energy represented by the motion-compensation prediction error coefficients as is possible. The largest amount of energy that the transmitter can impart to a receiver corresponds to the largest swings in the carrier's amplitude. Such "largest" carrier amplitude results in high positive and negative voltage level swings at the receiver. The product represented by the maximum RMS level of the receiver's voltage, times the interval during which that level is maintained, is shown in FIG. 8 by area 99.

When signal power is not considered, the objective is to pack as many of the motion-compensated prediction error coefficients in the time interval of area 99. The motion-compensated prediction error coefficients, which are analog in value, can be represented by analog valued samples and the samples can be concatenated to form a step-like analog signal. The number of samples that can be packed within the line scan interval is limited by the permissible bandwidth of the modulating analog signal and by the ability of the receiver to resolve the signals in the time domain. The utilization of area 99, under such circumstances, may be as depicted by curve 98 in FIG. 8. More specifically, the utilization is depicted by the area below area 98, which represents the RMS values of the analog samples.

From the above it appears that a more efficient utilization of the transmission medium can be achieved by increasing the area under curve 98 and reducing the area above it. This can be accomplished by encoding the error signals appropriately. The resulting signal may then be like the one depicted by curve 97 in FIG. 8. Each level in the signal of curve 97 represents either one or more signal pulses. The process of combining a number of signals to form one signal is a "many to one" mapping.

The combining of digitized signals can be quite straight forward. When a pair of like-signed signals has amplitude values lower than a selected value, such as the square root of the highest permissible amplitude, then the pair of signals may be combined to form a single digitized signal. The value of the resulting single signal may be dictated by a lookup table like the one depicted in FIG. 9. For example, when a first signal has the value 11 and a second signal has the value 3, the combined signal developed in accordance with the FIG. 9 table has the value 41. When converted to PAM format, a pulse of height 41 is sent to the receiver together with an indication that the pulse represents the combination of two signals. Upon receipt of such an indication and the value 41, the receiver accesses a similar look-up table and derives therefrom the two PAM pulses.

When a "one to many" mapping results in a signal with a specific analog level, as in the case above, great care must be taken in the encoding algorithm because transmission noise is always a factor. Specifically, the encoding algorithm must be such that a received signal that includes a small deviation from the transmitted level should not decode to signals that are markedly different from the signals that formed the transmitted level. It may be noted that the coding in the FIG. 9 table is so arranged. For example, a reception of level 10 when level 11 was transmitted does not cause an error in the decoded level of the second PAM pulse and changes the level of the first decoded PAM pulse by only one. The reception of level 16 when level 15 was transmitted causes no errors in the decoded level of the first PAM pulse and only an error of one level in the decoded level of the second PAM pulse.

The above describes a "many to one" mapping that aims to make the overall PAM signal out of the transmitter as large as possible. Actually, a similar consequence results from a "one to many" mapping where large digitized signals are encoded into two or more smaller signals. The encoding algorithm may be quite simple because the decoding process may simply be a combining of the constituent pulses. The "one to many" mapping improves utilization of area 99 (as does the "many to one" mapping) because it reduces the dynamic range of the signal and permits a more effective gain control mechanism.

Figure 9:
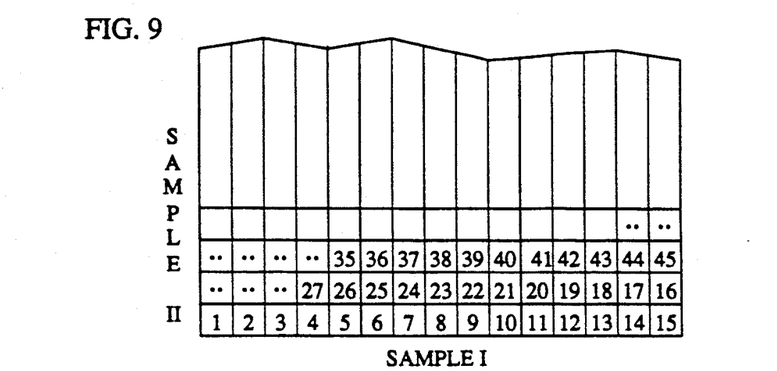
FIG. 9 presents a portion of an encoding look-up table that is useful in encoding two samples into one.

Whereas the FIG. 9 arrangement depicts an approach for combining two digitized signals, it should be clear that three (or more) digitized signals can be combined in a similar manner with a table (of corresponding dimensionality) that follows the concepts of FIG. 9.

When combining and splitting of the prediction error signals is not employed, the maximum number of PAM pulses that can be transmitted in region 99 is fixed (by the transmission bandwidth). When combining and splitting is employed, the maximum number of pulses that can be transmitted is no longer fixed. Rather, it depends on the signal characteristics. Still, experience with the transmission of various images gives some indication as to the percentage of digitized signals that can be combined, and that percentage provides an indication of the maximum number of signals that can be combined and transmitted to the receiver.

Figure 10:
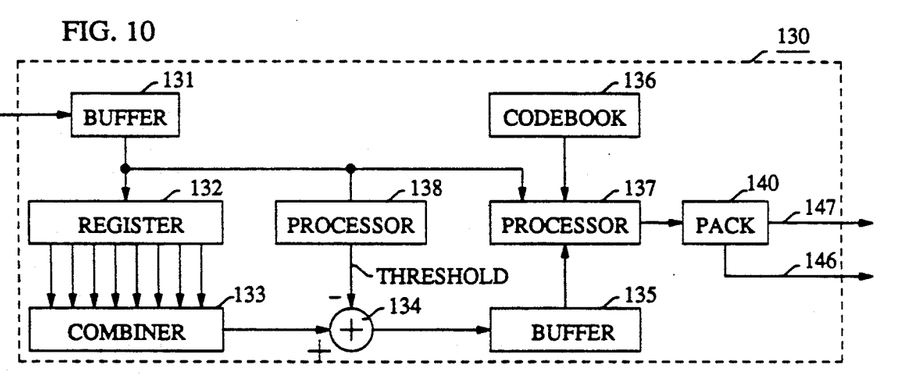
FIG. 10 presents the block diagram of one arrangement of the encoder within the FIG. 2 transmitter.

Returning to the detailed description of the FIG. 2 transmitter, FIG. 10 presents a detailed block diagram of encoder 130 for the aforementioned three step approach. For the selection step, we chose to evaluate the subband frames of FIG. 7 through vectors 36. Specifically, it was chosen to combine the energies in the 8 coefficients of each element of a vector (the 8 coefficients in the 2 by 4 array of coefficients in a subband) and to compare the combined value to a threshold, thereby developing binary values that reflect the comparison results. Stepping through the subband frames in a non-overlapping fashion yields a set of vectors with 1 and 0 element values. In FIG. 10, buffer 131 stores the 64 subband coefficients, outputs groups of 8 coefficients and stores them in register 132. Combiner 133 develops a measure of the energy in the 8 coefficients and applies the results to subtracter 134. Subtracter 134 develops a 1 output when the combiner signal is greater than the threshold, and a 0 output otherwise. This binary output is stored in buffer 135. Buffer 135 stores 64 bit vectors. Each vector relates to a block of 8 coefficients in the 64 subbands. A 1 in buffer 135 of the subbands suggests that the coefficients that produced the 1 should be transmitted, and a 0 suggests that the coefficients that produced the 0 need not be transmitted.

The threshold value applied to element 134 can be fixed or variable. It should not be set to a value that is so high that an insufficient number of coefficients are chosen to be transmitted. That would cause some transmission capacity to be unused. It should also not be so low that many more coefficients are selected for transmission than the available transmission capacity could handle. Such a selection would unnecessarily burden the processing equipment. FIG. 8 provides means for allowing the threshold to be set adaptively. Processor 138 has access to the coefficients in buffer 131. Knowing the transmission capacity, it sorts the coefficients (based on the energy of the coefficients) and counts from the sorted list the number of PAM pulses that would be transmitted. When the transmission capacity is exhausted, the energy level of the last-accepted coefficient becomes the applied threshold.

The assumption implied in deciding that savings will accrue when selected coefficients are not transmitted is that it takes more transmission capacity to transmit information which can be ignored, than to transmit the additional information necessary for identifying the information that is being transmitted. The assumption holds true only if the number K of such identifying information packets (that number being effectively controlled by the threshold level) and the capacity C required for identifying each such packet is such that the product KC (which is the capacity needed to identify what is transmitted) is less than the capacity saved by not transmitting the ignored information. This suggests that it is important to reduce C as much as possible.

The simplest way to identify the coefficients that are being transmitted and the coefficients that are not being transmitted is to transmit the 64 bit vector of 1s and 0s in buffer 135. Keeping the admonition to reduce C in mind, we discovered that image quality may be maintained while reducing the number of possible combinations from $2^{64}$ to $2^8$, or 256. A reduced set of possible combinations permits one to define each possible combination of 64 bits with only 8 bits. This mapping of 64 bits to 8 bits is achieved by creating a codebook table with 256 entries. Each entry maintains one of the 64 bit combinations (one codebook vector) and the codebook vector is identified by the address (index of the codebook vector) of the combination in the table. When such a codebook is employed, it becomes necessary to judiciously replace each of the combinations contained in buffer 135 with a codebook vector that best represents the replaced combination. This is the second step of encoder 130.

It is clear that, when considering a particular combination of 1s and 0s in buffer 135, selecting any codebook vector that specifies a different combination of 1s and 0s would result in the transmission of at least some coefficients with lower values than the threshold. That is, some high level coefficients that produced a 1 in buffer 135 may not be sent, and some low level coefficients that produced a 0 might be sent. Still, having decided to replace the full set of possible vectors with vectors from a limited set, it appears beneficial, at this level of optimization, to send the vector from the codebook that is a) most like the vector it replaces and b) transmits the most combined prediction error coefficients energy.

In FIG. 10, block 136 contains a codebook of 256 vectors of 64 bits each. Processor 137 is responsive to the codebook, to buffer 135, and to buffer 131. In accordance with one approach of this invention and the above-described beneficial choices, processor 137 identifies the information in buffer 131 that corresponds to a vector of 1s and 0s in buffer 135, determines the number of 1s in that buffer 135 vector, and tentatively selects from codebook 136, one at a time, those vectors with an equal number of 1s. It then evaluates the combined energy of all coefficients that would be transmitted if the tentatively selected vector were finally selected, and does finally select that tentatively selected vector that would transmit the set of coefficients with the largest combined energy. The selected codebook vector and the selected coefficients from buffer 131 are applied to packing block 140.

The function of block 140 is to sort the information by the degree of importance that the sorted information has for the development of a high quality reproduction of the video frame, and to transmit as much of the important information as is possible within the constraints of the channel capacity. This packing function is achieved in block 140 by creating a table that contains four columns: a codebook vector identifier column, a number of selected coefficients column, a block number identifier column, and an importance measure column (e.g. total energy in the subbands selected for transmission in accordance with the 1—s in the vector). As an aside, the second column, which indicates a number of selected coefficients, is strictly a function of the codebook. For example, for a codebook of 16 codebook vectors, the vector identifier can be a 4-bit number in the range 0000 to 1111. Vector identifier 0000 may correspond, for example, to vector 0100110001110000. That means that whenever vector identifier 0000 is found in the first column of the table, the second column of the table contains the number 48 (which is the number of 1's in vector 0100110001110000 times 8—8 being the number of pixels in the subband group).

The packing process proceeds in block 140 by sorting on the "importance" column. As illustrated in the table below, the first entry belongs to codebook vector 1001, with 56 selected error coefficients. This entry is for block 23, which has an energy level of 731. The second entry belongs to codebook vector 1100, with 24 selected error coefficients. This entry is for block 511, which has an energy level of 623. The third entry belongs to codebook vector 0001, with 3 (different) selected subbands. This entry is for block 127, which has an energy level of 190. Subsequent entries (which are not shown) have lower energy levels.

| vector ID | # of coeff. | block ID | importance |
| --- | --- | --- | --- |
| 1001 | 56 | 23 | 731 |
| 1100 | 24 | 511 | 511 |
| 0001 | 24 | 127 | 190 |
| 0101 | 8 | 1023 | 102 |

In addition to the above sorting and selection from the top of the sorted list, block 140, performs the above described signal combining function signals when the magnitudes of the error signals so suggest (per FIG. 9). By selecting from the sorted table, keeping track of the number of selected coefficients (column 2), performing the "many to one" and "one to many" mappings and augmenting the selections information in accordance with these mappings, block 140 is able to keep track of channel capacity that is taken up by the entries selected from the sorted table. When the allotted capacity (i.e., number of PAM pulses) is exhausted, selections from the table are terminated. The mappings can also be carried out in processor 137. When processor 137 performs the mapping, the codebook vectors themselves may carry the information that identifies which samples are mapped and which are not. That is, codebook 136 may be large enough to accommodate the mapping information, processor 137 may simply append the mapping information to the codebook vector identifiers, or block 140 can do the appending. In all cases, digital information is provided to formatter 170 for transmission.

Figure 11:
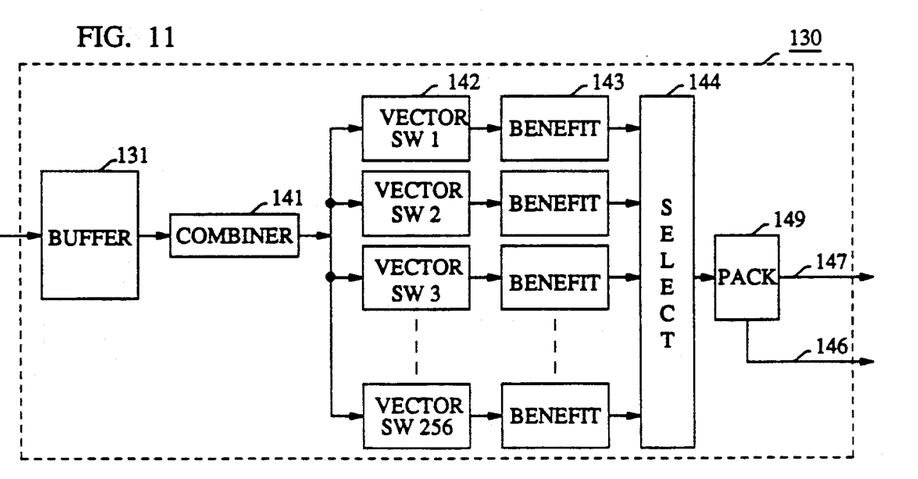
FIG. 11 presents the block diagram of another arrangement of the encoder within the FIG. 2 transmitter.

The above-described encoding, selecting, and packing approach of encoder 130 is merely illustrative, of course. FIG. 11 presents another approach.

In FIG. 11, the input to encoder 130 is applied (as in FIG. 10) to buffer 131. The groups of 8 pixels from each of the 64 subbands (vector 36) are accessed from buffer 131 and applied to block 141, which develops a measure of the energy in each of the elements of the 64-element vector. This information is applied to 256 codebook vector switching circuits 142. Each circuit 142 merely passes the energies of the elements that correspond to a 1 in the codebook vector. Thus, the output of a circuit 142 that pertains to codebook vector P provides a measure of the energy that would be sent if that codebook vector were used. On first blush, one might believe that sending the most energy is best, and that would suggest selecting a codebook vector with a large number of 1s. However, an unadulterated measure of the energy may be counter indicated. Since the total number of 1s in the selected codebook vectors is fixed, a better approach would be to maximize the *benefit that each* 1 in the selected vectors provides. Selecting the latter measure, each switch 142 in FIG. 11 is followed by a benefit measuring circuit 143. The benefit measure may be the average energy per 1 in the codebook vector, or some other measure.

To optimize the selection, the outputs of the 256 benefit measuring circuits are applied to selector block 144. It selects the codebook that offers the greatest benefit per 1 in the codebook; which is also the greatest benefit per transmitted set of 8 prediction error coefficients. The output of selector 144 is applied to packing block 149, which is very similar to packing block 140. To wit, block 149 sorts the chosen codebook vectors by their benefit measures selects from the top of the sorted list performs the "many to one" and "one to many" mappings as appropriate, and accumulates signals to be transmitted until the transmission capacity is exhausted.

The above-described concept of packing more than one PAM pulse in a single slot improves performance via a better utilization of the available capacity as it is reflected by area 99 of FIG. 8. There is another aspect of area 99 that may be addressed, and that is noise immunity. Since noise that is introduced by the transmission medium (between the transmitter and the receiver) is independent of the level of the transmitted signal, it is clearly advisable to transmit as large a signal as possible. This can be achieved in the system of our invention by introducing a controllable gain feature (CGF) into the transmitter and receiver.

As suggested above, the "one to many" signal mappings process interacts well with the CGF process because large signals are broken up into intermediate signals, and that reduces the overall "spikiness" of the signal. The lack of very large signals permits a larger CGF signal to be applied to element 154, and that results in a greater portion of area 98 to be encompassed by the signal energy.

Still, one must expect that noise will inevitably be introduced in the course of transmitting information to the receiver and that the information within buffer 165 will eventually differ from the information in buffer 160. This problem is overcome by the well known technique of inserting in the transmitted error signal a fraction of the true image, and by discarding in the receiver a corresponding fraction of the image stored in buffer 165. This is known as "signal leak".

The leak inserted can be fixed or can be adaptive. There is reason to believe that "adaptive leak" (which is leak of a fraction that is a function of some variable) is preferable to "fixed leak". When the prediction error samples are generally of low amplitude, the conclusion is that the motion compensated signal without any correction is fairly accurate. A first consequence of this fact is that the receiver's *predicted* image will not be far off from the true image, and, therefore, there is little reason to inject a leak signal. A second consequence of this is that low amplitude prediction error signals permit a high gain factor, and a high gain factor enhances noise immunity which, in turn, causes the resulting image to be accurate and, hence, one does not need to resort to a leak signal. Accordingly, when the prediction error signals are small, a small leak factor is used. As a corollary to this, when the prediction error signals are large, the correlation with the previous frame is small, noise is more likely to be introduced, and it is desirable to decrease the effect of noise from staying in the receiver's buffer. Therefore, a larger leak factor is used. Of course, the movement from a large leak factor to a small leak factor does not have to be made in a single step. In the ultimate, a leak factor of 1 can be provided to erase all history of previously received noise.

Figure 12:
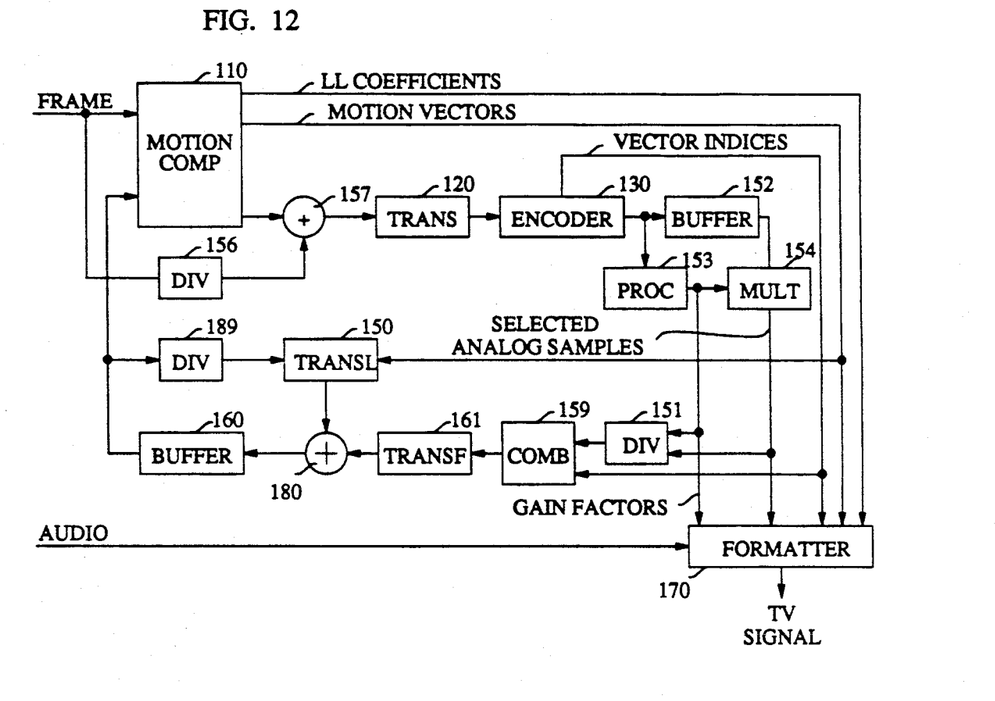
FIG. 12 is a block diagram of a transmitter which includes leak and a controllable gain feature.
Figure 13:
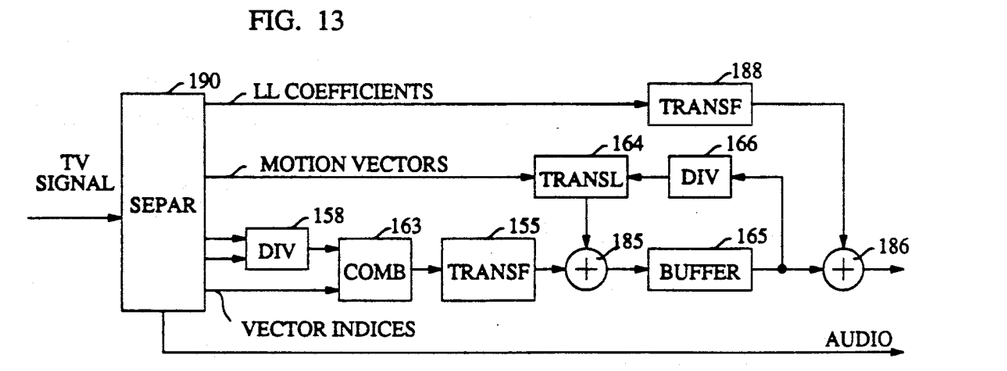
FIG. 13 is a block diagram of a receiver that comports with a transmitter of FIG. 12.

FIGS. 12 and 13 present block diagrams of a transmitter and a receiver that include signal leak and CGF. The CGF capability is achieved by applying the PAM pulses delivered by block 140 (within block 130) to a buffer 152, which basically is a delay line. Processor 153, which is also responsive to the output of block 140 determines, at fixed intervals, the largest PAM pulse within the delay line buffer. Based on that information, a multiplicative factor is selected and applied to multiplication element 154, which receives its second input from buffer 152. The result is sent to formatter 170. The multiplicative factor, which is the CGF control signal, is also sent to formatter 170, for transmission to the receiver. The CGF action is accounted for in divider 151 which is responsive to the multiplication factors of processor 153 and to the output of element 154. The result is sent to combiner 159 which, with the vector information of encoder 130, recreates the frequency components of transform circuit 120 (as best it can). Those frequency components are transformed in block 161, to reverse the transformation effected in block 120, and the results are applied to adder 180. Concurrently, the motion vectors of block 110 are applied to translator 150. With the aid of these vectors, translator 150 modifies the information of frame buffer 160, and applies the results to adder 180. The sum signals developed in adder 180 are stored in buffer 160.

Actually, translator 150 is not connected to buffer 160 directly. Interposed between the two is a divider 189. The function of divider 189 is to account for the signal leak of block 156. Block 156 is responsive to the frame information applied to block 110. It transmits to its output a fraction of the signal applied to its input. That fraction is added by adder 157 to the motion compensated signal that is delivered by block 110 to block 120. Adder 157 is interposed between blocks 110 and 120. When a fixed leak is used, the fraction that we use in block 156 is 1/32. Divider 189, which accounts for the signal leak in the transmitter's feedback path, also transmits to its output a fraction of its input. With fixed leak, when the fraction in block 156 is 1/32, the fraction in block 189 is 31/32.

When adaptive leak is used, the measure of the prediction error signal strength needs to be developed. This is accomplished in the transmitter within leak processor 196 which is responsive to the prediction error signals coming from block 110. The function of block 196 is to develop one divisor level that is applied to block 156 and a complementary divisor level that is applied to block 189 and to formatter 170. There are different approaches that may be taken for developing a divisor level, and different artisans may choose from among them. Block 196 may develop, for example, a measure of the energy in the spatial prediction error signals applied to the block, or a measure of the signal's variance. The measure developed can be for an entire frame, or for a subsection (block) within the frame. When the measure that is developed in element 196 is for blocks within a frame, the circuit is adjusted to alter the developed divisor levels gradually in order to prevent block-boundary artifacts. Block 196 may also include a transform circuit, much like circuit 120, which develops frequency spatial prediction error signals. With the inclusion of such a transform circuit, the developed divisor level may be made sensitive to particular frequency bands.

The receiver of FIG. 13 comports with the transmitter of FIG. 12. Separator 190 includes means for culling out the LL coefficients, the motion vectors developed in block 110 of the transmitter, the prediction error vectors of codebook 136 (which may include the mappings information), the leak factors and the CGF multiplication factors. The CGF multiplication factors are applied to a divider circuit 158 which complements the actions of circuit 154 in FIG. 12. The output of divider 158 is applied to combiner circuit 163 and the output of circuit 163 is applied to transform circuit 155. The output of circuit is applied to adder 185 which feeds buffer 165. The output of buffer 165 is applied to divider block 166, (which is responsive also to the leak factors found on line 208) and it supplies signals to translator circuit 164. Translator 164 is also responsive to the motion vector of block 190 and its output forms the second input of adder 185. The functions of blocks 158, 163, 155, 185, 165, 166, and 164 are identical to the functions of blocks 151, 159, 161, 180, 160, 189 and 150, respectively. As in the receiver of FIG. 3, output of buffer 165, which is the received $\overline{LL}$ frame, is applied to adder 186 where it is added to the LL frame developed in transform circuit 188. It may be noted in passing that divider circuit 158 affects only the amplitude of the prediction error signals. Skilled artisans would surely realize that divider 158 could follow combiner 163, rather than precede it, if so desired.

Actually, the "many to one" mapping represented by FIG. 9 may work to the detriment of the noise immunity effort of the controllable gain feature because it may create large amplitude samples. For example, and with reference to FIG. 9, the encoding effort may take a sample I of amplitude 3 and a sample II of amplitude 14, and develop therefrom a sample of amplitude $(13 \times 15 + 3)$, or 198. The very large signals that can possibly be created by the "many to one" mapping presents a dilemma.

Low amplitude signals are combined to enhance noise immunity, but when the combined signals are very large, noise immunity suffers because of the lower gain control factor that may be tolerated.

When space is available for additional signals to be included in the retrace period of the transmitted signal, this dilemma is resolved by deleting very large prediction error samples, whether naturally occurring or developed through "many to one" mappings, and sending the deleted samples in digital form, perhaps during the retrace period. Of course, one would need to transmit both the amplitude and the "address" of the sample. Still, deleting the high-amplitude error signals from consideration during the line scans interval allows the CGF blocks to develop larger gain factors, which substantially improves noise immunity and results in overall benefit.

Actually, the heretofore-described transmitters and receivers already employ the concept of removing frequency components from the line scans interval and placing them in the retrace interval; to wit, the LL coefficients which are placed in the retrace interval. The LL coefficients are taken as a group, which is relatively easy to do, and one can think of the decision to take this approach as a consequence of an implied assumption is that all of the LL coefficients are large and (hence) important. A positive factor in this approach is that all of the LL coefficients are present and, therefore, there is no need to expend capacity to identify the coefficients. The negative factor in this approach is that there is no definite rule for the selection of a cutoff frequency for the LL band. This suggests, in turn, that a cutoff frequency selection may cause a number of the transmitted LL signals to be relatively low, or a number of the low frequency coefficients that are not included in the LL band to be relatively high.

In some applications it may turn out that the variability in the transmitted images is such that there are very few LL coefficients that are consistently of high amplitude. In such applications, it makes sense to dispense with the entire concept of an LL band. In other applications the LL components are more prevalent, and in such applications there is room for both approaches. Some capacity during the retrace interval is preserved for the LL band, and some capacity is dedicated for the peaks in the spatial frequency domain prediction error signals.

The above approaches of mapping, controllable gain feature, and deletions of high amplitude prediction error signals from the lines scans interval help to impart noise immunity to the prediction error signals. But, additional noise immunity may need to be provided to account for burst errors, fading, and multi-path receptions.

In the "digital world," fading and burst error correction approaches typically disperse the signal within some transmission interval and depend on embedded error correction codes to recover the signal. The error correction codes which are embedded, or encoded, into the transmitted signal increase the amount of information that needs to be transmitted; but that "overhead" is typically considered worth while. Multi-path receptions are usually not a concern in digital transmissions and, in any event, they are either accepted (erroneously) as a valid signal or are declared to be errors in reception, with attendant corrections if the error correction methods are robust enough.

The more interesting question is what to do with non-digital terrestrial transmission where multi-path receptions are common and where the limited channel capacity does not permit transmitting a large amount of "overhead" information.

In accordance with this invention, improved operation results from the use of scrambling. With scrambling, burst errors, fading, and "ghosts" which are due to multi-path receptions are dispersed throughout the scrambling interval. When the received signal is unscrambled in the receiver, the burst errors, fading, and multipath receptions results in dispersed noise. Such noise manifests itself as "snow" throughout the picture and is much less objectionable than "ghosts" or a concentrated area of poor imaging. Different scrambling techniques may be employed, but one of the simplest one is to use a pseudo-random noise generator.

Figure 14:
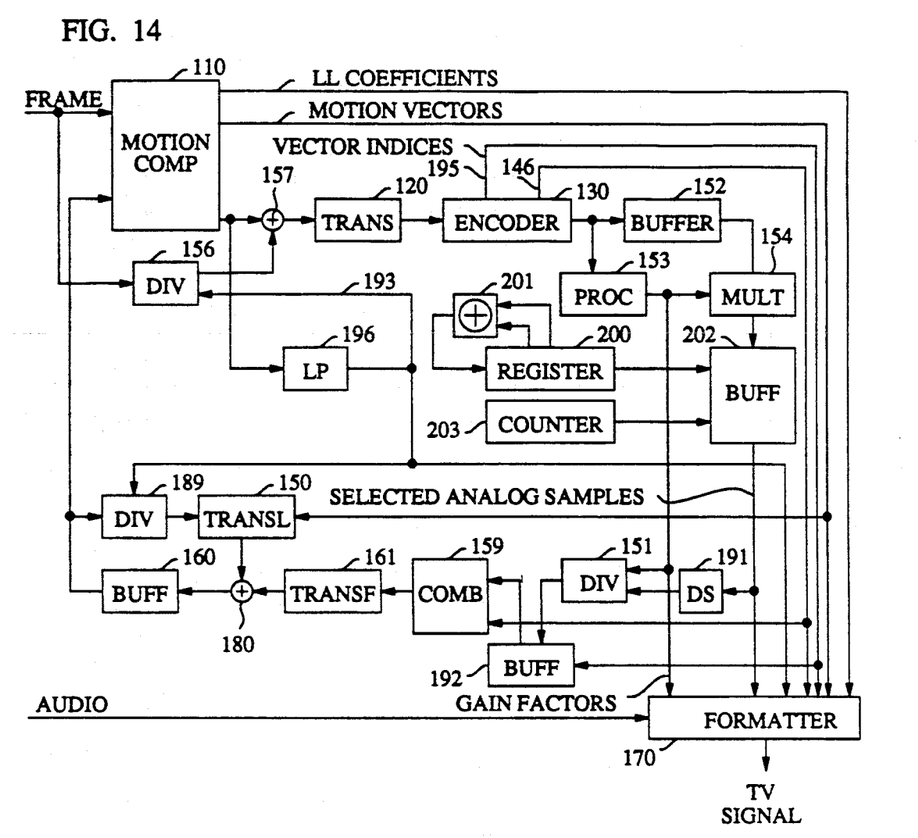
FIG. 14 is a block diagram of a transmitter which includes leak, a controllable gain feature, and means for selectively encoding prediction error signals in digital form for transmission during retrace intervals.
Figure 15:
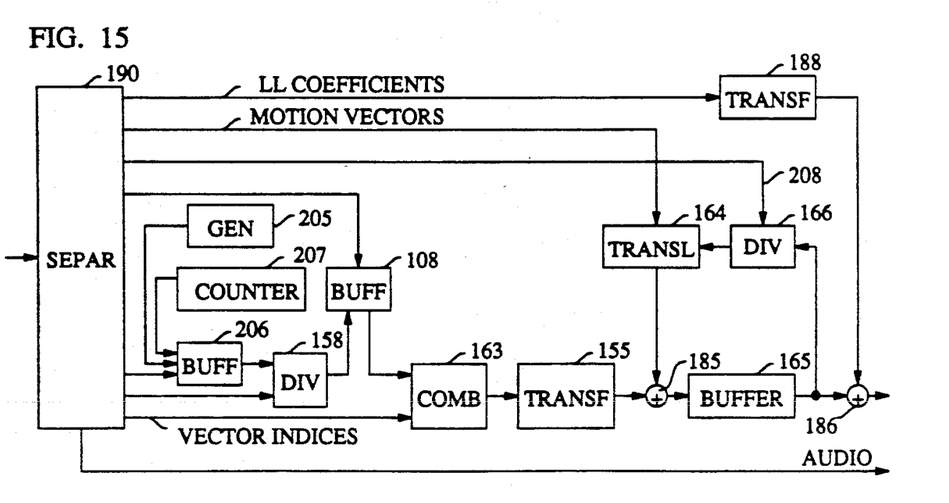
FIG. 15 is a block diagram of a receiver that comports with a transmitter of FIG. 14.

FIGS. 14 and 15 present block diagrams of a transmitter and a receiver that include the mappings, the selective deletion of prediction error signals, the scrambling, CGF, and signal leak.

In the transmitter, the selective deletions are carried out within block 130. The hardware for doing it is quite straight forward and, in the embodiment of FIG. 10, it can comprises a simple amplitude-sensitive routing circuit interposed between processor 137 and packing block 140 (the dashed block marked K). The routing circuit passes signals to block 140 when the amplitude of those signals is below a set threshold. When the amplitude is above the set threshold, the coded representations of the signals are applied, instead, directly to formatter 170, via line 195.

The CGF capability is achieved by applying the PAM pulses delivered by block 140 to a buffer 152, which basically is a delay line. Processor 153, which is also responsive to the output of block 140 determines, at fixed intervals, the largest PAM pulse within the delay line buffer. Based on that information, a multiplicative factor is selected and applied to multiplication element 154, which receives its second input from buffer 152. The result is sent to formatter 170. The multiplicative factor, which is the CGF control signal, is also sent to formatter 170, for transmission to the receiver.

Lastly, the scrambling feature is incorporated. Different scrambling techniques may be employed, but one of the simplest ones is to use a pseudo-random number generator. In accordance with this technique, the transmitter includes a shift register 200 and an Exclusive OR gate 201 which is connected to selected stages of shift register 200. The length of register 200 and the stages connected to gate 201 are selected to develop a pseudo-random sequence of length K, where K is the number of transmitted samples in a frame. With each vertical synch, the register is initialized to insure that it remains synchronized. The scrambling is accomplished by inserting the output signals of multiply circuit 154 into a buffer 202 using a sequential address counter 203, and extracting the data out of the buffer using the parallel output of register 200.

In the feedback path of the transmitter, block 191 is the descrambler. It is responsive to the output of buffer 202 and its detailed construction is presented below in connection with the receiver design. It should suffice, however, to mention that the operation that descrambler 191 performs is simply the inverse of the operation performed by the scrambler circuit.

The output of descrambler 191 is applied to division circuit 151. Circuit 151 is also responsive to the multiplicative factors that are applied to formatter 170 by processor 153. The result is sent to buffer/processor circuit 152 where the samples that were deleted by encoder 130 are reinserted. The output of buffer/processor adder 192 is applied to combiner 159 which, with the vector information of encoder 130 recreates the frequency components of transform circuit 120 (as best it can). Those frequency components are transformed in block 161, to reverse the transformation effected in block 120, and the results are applied to adder 180. Concurrently, the motion vectors of block 110 are applied to translator 150. With the aid of these vectors, translator 150 modifies the information of frame buffer 160, and applies the results to adder 180. The sum signals developed in adder 180 are stored in buffer 160.

Actually, translator 150 is not connected to buffer 160 directly. Interposed between the two is a divider 189. The function of divider 189 is to account for the signal leak of block 156. Block 156 is responsive to the frame information applied to block 110. It transmits to its output a fraction of the signal applied to its input. That fraction is added by adder 157 to the motion compensated signal that is delivered by block 110 to block 120. Adder 157 is interposed between blocks 110 and 120. When a fixed leak is used, the fraction that we use in block 156 is 1/32. Line 193 provides the signal information that divides 156 for the adaptive leak feature. Divider 189, which accounts for the signal leak, also transmits to its output a fraction of its input. When the fraction in block 156 is 1/32, the fraction in block 189 is 31/32.

The receiver of FIG. 12 comports with the transmitter of FIG. 11. Separator 190 includes means for culling out the LL coefficients, the motion vectors developed in block 110 of the transmitter, the prediction error vectors of codebook 136 (which may include the mappings information), the digitally encoded prediction error signals, the PAM encoded prediction error signals, and the CGF multiplication factors. The PAM encoded signals are applied to a descrambling arrangement comprising a pseudo-random noise generator 205, a buffer 206 responsive to the PAM encoded prediction error signals, and a counter 207. The arrangement is identical to the scrambler arrangement of FIG. 11 except that the information is inserted into buffer 206 under control of the pseudo-random noise generator and is extracted under control of the counter. This reversal in operation performs the unscrambling function.

To undo the CGF action, the output of buffer 206 and the detected CGF multiplication factors are applied to a divider circuit 158. Circuit 158 complements the actions of circuit 154 in FIG. 11. The output of divider 158 is applied to buffer/processor block 208. Block 208 is responsive to the digitally encoded prediction error samples that were deleted within block 130, sent separately, and culled out in block 190. The function of block 208 is to inject the missing prediction error signals at the appropriate times to result, in a signal with no missing prediction error samples. The vector indices and the output of block 208 are applied to combiner circuit 163 and the output of circuit 163 is applied to transform circuit 155. Circuit 163, in combination with the codebook vector indices information, recreates the frequency components of the prediction error signals. Circuit 155 transformers that information to the spatial domain. The output of circuit 155 is applied to adder 185 which feeds buffer 165. The output of buffer 165 is applied to divider block 166, and it supplies signals to translator circuit 164. Translator 164 is also responsive to the motion vector of block 190 and its output forms the second input of adder 185. The functions of receiver blocks 158, 163, 155, 185, 165, 166, and 164 are identical to the functions of transmitter blocks 151, 159, 161, 180, 160, 189 and 150, respectively.

As in the receiver of FIG. 3, output of buffer 165, which is the received $\overline{LL}$ frame, is applied to adder 186 where it is added to the LL frame developed in transform circuit 188. It may be noted in passing that divider circuit 158 affects only the amplitude of the prediction error signals. Skilled artisans would surely realize that divider 168 could follow combiner 163, rather than precede it, if so desired.

Although the above-described approach sends the motion-compensated prediction error signals in PAM format, the principles of this invention are applicable with equal efficacy to other modes of transmissions. Specifically, experimental results suggest that extremely good results can be obtained by sending only 200,000 error signals. Clearly, these error signals can be coded digitally and transmitted in that fashion over whatever transmission medium can handle the resulting bandwidth. Sending this information digitally over cable, for example, would obviate the need for the entire RF section of the transmitter (which is not shown in FIG. 1 anyway) and for the RF receiver section. Also, organization of the signals which puts the prediction error signals in the line scans period and the vector information in the retrace period need not be adhered to.

The above description presents the principles of this invention in the course of describing a transmitter and receiver arrangement that is suitable for HDTV. The details of construction of the illustrative embodiments that were presented are not delved into for the sake of brevity. All of the blocks that make up the designs presented in the figures can be created with conventional designs without undue experimentation. Indeed, many of the blocks in the transmitter and the receiver perform identical functions and can be constructed in an identical manner with conventional components.

It should be noted that other embodiments can be created that are encompassed within the spirit and scope of this invention. For example, it has been concluded through experimentation that a better performance is obtained (subjectively) by transforming the error signal developed in block 110 (in block 120) and by discarding some of the resulting frequency coefficients (in block 130). Actually, even in the time domain the error signal is generally small. When the available bandwidth is large and/or when the encoding process is efficient enough, it is possible to consider encoding the error signals themselves. The really small errors would be ignored, the large errors would be encoded, and some averaging can even be included. For example, the pixel that is ignored (because it error level is too low) but which is next to a pixel that is selected and encoded can be assumed to have a value just under the threshold level. Eliminating the need to transform into the frequency domain and back to the time domain clearly has a positive effect on the cost of the transmitter and the receiver.

We claim:

1. A method for developing a video signal for transmitting frames of information representing an image, comprising the steps of:
    developing a first signal representing a frame of said image;
    modifying said first signal to develop a second signal that is a concatenated plurality of amplitude discrete samples approximating said first signal;
    separating said second signal into intervals, where each interval comprises a given number of said samples;
    for each interval, a) determining the largest sample amplitude found within the interval, b) based on said determining, developing a modification factor, c) modifying the amplitudes of all samples in the interval in accordance with said modification factor and forwarding the modified samples for transmission, and d) separately forwarding the modification factor for transmission.

2. The method of claim 1 wherein said modifying comprises the steps of:
    mapping pairs of adjacent amplitude discrete samples that have an amplitude value below a preselected "floor" threshold into single amplitude discrete samples, and
    forwarding for transmission information for identifying the mapped single amplitude discrete samples.

3. The method of claim 1 wherein said modifying comprises the steps of:
    converting each amplitude discrete sample that has an amplitude value greater than a preselected "ceiling" threshold into a cluster having plurality of amplitude discrete samples, and
    forwarding for transmission the identity of said each amplitude discrete sample that is converted into a cluster.

4. The method of claim 1 wherein said modifying comprises the steps of:
    converting each amplitude discrete sample that has an amplitude value greater than a preselected "ceiling" threshold into a digital representation that identifies the sample and its amplitude;
    discarding said discrete amplitude sample; and
    forwarding for transmission said digital representation.

5. A method for developing a video signal for transmitting frames of information representing an image, comprising the steps of:
    developing a first signal representing a frame of said image;
    modifying said first signal to develop a second signal that is a concatenated plurality of amplitude discrete samples approximating said first signal;
    reordering the amplitude discrete samples individually in accordance with a signal independent scrambling order, to form a third signal; and
    forwarding said third signal for transmission.

6. The method of claim 5 wherein said discrete amplitude signals are pulse amplitude coded signals.

7. The method of claim 5 wherein said scrambling order is dictated by a predetermined pseudo-random number sequence, where successive numbers in the sequence control the reordering of successive ones of said amplitude discrete samples.

8. The method of claim 7 wherein the number of numbers in said sequence is greater than the number of samples in a line scan of said image.

9. The method of claim 7 wherein the number of numbers in said sequence is greater than the number of samples in said frame of said image.

10. The method of claim 7 further comprising a step of restarting said sequence with each frame of said image.

11. A method for developing a video signal for transmitting frames of information representing an image, comprising the steps of:
  developing a first signal representing a frame of said image;
  modifying said first signal to develop a second signal that is a concatenated plurality of amplitude discrete samples, said second signal being related to said first signal;
  converting each amplitude discrete sample that has an amplitude value greater than a preselected "ceiling" threshold into a digital representation signal that identifies the sample and its amplitude;
  discarding from said second signal each of said amplitude discrete samples that is converted by said step of converting
  forwarding for transmission undiscarded ones of said amplitude discrete samples of said signal; and
  forwarding for transmission said digital representation signals.

12. The method of claim 11 where said step of modifying develops a prediction error signal indicative of the error between signals representing said image and signals that predict said image, and modifies said prediction error signals by adding a fraction of said image signal to said prediction error signal.

13. The method of claim 12 wherein said fraction is variable.

14. The method of claim 13 wherein said fraction is based on said prediction error signal.

15. The method of claim 13 wherein said fraction is based on the energy in said prediction error signal.

16. The method of claim 13 wherein said fraction is based on the variance in said prediction error signal.

17. The method of claim 12 wherein said prediction error signal comprises spatial frequency components.

18. The method of claim 17 wherein said fraction is based on a subset of said spatial frequency components.

19. A receiver for displaying a video frame in response to a signal having a retrace interval, a vertical sync pulse associated with said retrace interval, and a line scans interval timed with respect to said sync pulse, comprising:
  means for receiving prediction error signals during said line scans interval, for receiving gain factor information, and for receiving motion vector signals during said retrace interval;
  a frame buffer for storing a current set of signals representing at least a portion of said video frame;
  translator means for combining said current set of signals stored in said frame buffer with said motion vectors;
  means for augmenting output signals of said translator means in response to said prediction error signals and said gain factor information; and
  means for storing output signals of said means for augmenting in said frame buffer.

20. The receiver of claim 19 wherein said means for receiving includes means for receiving LL coefficients representing two-dimensional low frequency components of said video frame, and said receiver further comprises means for converting said LL coefficients to time domain signals and means for adding said time domain signals to output signals of said buffer to develop said video frame.

21. The receiver of claim 19 wherein said means for receiving includes means for receiving error signals encoding information, and said receiver further comprises second combining means interposed between said means for receiving and said means for augmenting, for combining said overall prediction error signals and said error signals encoding information.

22. The receiver of claim 19 wherein said overall prediction error signals represent spatial frequency coefficients and said augmenting means includes transform means for converting the applied prediction error signals to spatial domain signals.

23. The receiver of claim 21 wherein said prediction error signals represent spatial frequency coefficients and said augmenting means includes transform means for converting the applied prediction error signals to spatial domain signals.

24. The receiver of claim 19 where said translator means combines a fraction of said current set of signals stored in said frame buffer with said motion vectors, where said fraction is less than 1.

25. The receiver of claim 19 where said translator means combines a fraction of said current set of signals stored in said frame buffer with said motion vectors, where said fraction corresponds to a fraction factor recevied by said means for receiving.

26. The receiver of claim 21 wherein said error signals coding information comprises coded information to identify subbands contained in said prediction error signals.

27. The receiver of claim 23 wherein said means for augmenting includes means for transforming said prediction error signals from the spatial frequency domain to the spatial domain.

28. The receiver of claim 23 wherein said means for augmenting includes means for performing "one to many" mappings on said prediction error signals.

29. The receiver of claim 23 wherein said means for augmenting includes means for performing "many to one" mappings on said prediction error signals.

30. The receiver of claim 23 wherein said means for augmenting includes means for scrambling the positions of individual ones of said prediction error signals.

* * * * *